United States Patent
Kozlov

(10) Patent No.: US 9,044,677 B2
(45) Date of Patent: Jun. 2, 2015

(54) SYSTEM FOR OPTIMIZING PROCESSING CAPACITY FOR A GROUP OF GAMING APPLIANCES ENGAGED IN PLAY OF AN ONLINE GAME

(75) Inventor: Semen Kozlov, Palo Alto, CA (US)

(73) Assignee: Roblox Corporation, San Mateo, CA (US)

( * ) Notice: Subject to any disclaimer, the term of this patent is extended or adjusted under 35 U.S.C. 154(b) by 528 days.

(21) Appl. No.: 13/180,203

(22) Filed: Jul. 11, 2011

(65) Prior Publication Data

US 2013/0017889 A1 Jan. 17, 2013

(51) Int. Cl.
| | |
|---|---|
| A63F 13/00 | (2014.01) |
| A63F 13/30 | (2014.01) |
| A63F 13/323 | (2014.01) |
| A63F 13/31 | (2014.01) |
| H04L 29/06 | (2006.01) |

(52) U.S. Cl.
CPC ............. *A63F 13/12* (2013.01); *A63F 2300/66* (2013.01); *A63F 2300/552* (2013.01); *A63F 2300/6615* (2013.01); *H04L 67/38* (2013.01); *A63F 2300/534* (2013.01); *A63F 2300/538* (2013.01)

(58) Field of Classification Search
CPC .................... A63F 2300/538; A63F 2300/534; A63F 2300/552; A63F 2300/66; A63F 2300/6615; A63F 13/30; A63F 13/31; A63F 13/323; H04L 67/38
USPC ........................................ 463/31, 42; 345/522
See application file for complete search history.

(56) References Cited

U.S. PATENT DOCUMENTS

| | | | | |
|---|---|---|---|---|
| 6,215,495 | B1 * | 4/2001 | Grantham et al. | 345/419 |
| 6,313,838 | B1 * | 11/2001 | Deering | 345/420 |
| 6,767,287 | B1 * | 7/2004 | Mcquaid et al. | 463/42 |
| 6,846,238 | B2 * | 1/2005 | Wells | 463/39 |
| 7,156,733 | B2 * | 1/2007 | Chiang et al. | 463/1 |
| 7,334,145 | B2 * | 2/2008 | Grobman | 713/322 |
| 7,699,703 | B2 * | 4/2010 | Muir et al. | 463/29 |
| 7,739,532 | B2 * | 6/2010 | Grobman | 713/322 |
| 7,850,528 | B2 * | 12/2010 | Wells | 463/42 |
| 8,221,241 | B2 * | 7/2012 | Davis et al. | 463/42 |
| 8,462,166 | B2 * | 6/2013 | Sowerby et al. | 345/522 |
| 8,527,239 | B2 * | 9/2013 | Sowerby et al. | 702/186 |
| 8,698,813 | B2 * | 4/2014 | Iwasaki | 345/501 |
| 8,832,568 | B2 * | 9/2014 | Baszucki | 715/757 |
| 8,842,116 | B2 * | 9/2014 | Kozlov et al. | 345/420 |
| 8,864,583 | B1 * | 10/2014 | Lotzer | 463/31 |
| 8,876,601 | B2 * | 11/2014 | Kim et al. | 463/31 |
| 8,881,215 | B2 * | 11/2014 | Perlman et al. | 725/114 |
| 8,882,593 | B2 * | 11/2014 | Yamashita | 463/31 |

(Continued)

*Primary Examiner* — William H McCulloch, Jr.
(74) *Attorney, Agent, or Firm* — Donald R. Boys; Central Coast Patent Agency, Inc.

(57) ABSTRACT

A network-connected system serving digital games includes a game server having a first software application executing from a non-transitory physical medium coupled to the server, the server serving a digital game to individual ones of network-connected digital appliances, and distributed client software applications executing from non-transitory physical mediums coupled to the network-connected digital appliances. The client software applications monitor local processing capability for real-time processing of served objects and effects, communicate capability information to the game server, and the game server serves objects and effects compatible with a higher level of processing capability or objects and effects compatible with a lower level of processing capability depending on the capability information communicated.

12 Claims, 5 Drawing Sheets

(56) References Cited

U.S. PATENT DOCUMENTS

| | | | |
|---|---|---|---|
| 8,933,948 B2* | 1/2015 | Sowerby et al. | 345/522 |
| 2003/0064805 A1* | 4/2003 | Wells | 463/39 |
| 2003/0078103 A1* | 4/2003 | LeMay et al. | 463/43 |
| 2004/0121837 A1* | 6/2004 | Chiang et al. | 463/24 |
| 2005/0084237 A1* | 4/2005 | Kellner et al. | 386/68 |
| 2005/0101383 A1* | 5/2005 | Wells | 463/39 |
| 2005/0273636 A1* | 12/2005 | Grobman | 713/322 |
| 2007/0150893 A1* | 6/2007 | Grobman | 718/1 |
| 2007/0202941 A1* | 8/2007 | Miltenberger et al. | 463/25 |
| 2007/0243934 A1* | 10/2007 | Little et al. | 463/40 |
| 2008/0009344 A1* | 1/2008 | Graham et al. | 463/25 |
| 2008/0100630 A1* | 5/2008 | Bakalash et al. | 345/505 |
| 2009/0104954 A1* | 4/2009 | Weber et al. | 463/1 |
| 2009/0233705 A1* | 9/2009 | LeMay et al. | 463/25 |
| 2010/0105454 A1* | 4/2010 | Weber et al. | 463/1 |
| 2010/0178986 A1* | 7/2010 | Davis et al. | 463/42 |
| 2010/0281508 A1* | 11/2010 | Poder et al. | 725/93 |
| 2010/0306674 A1* | 12/2010 | Salesky et al. | 715/753 |
| 2011/0165930 A1* | 7/2011 | Brosnan et al. | 463/16 |
| 2012/0004041 A1* | 1/2012 | Pereira et al. | 463/42 |
| 2012/0081377 A1* | 4/2012 | Sowerby et al. | 345/522 |
| 2012/0225723 A1* | 9/2012 | Webster et al. | 463/42 |
| 2012/0252582 A1* | 10/2012 | Hilleman | 463/43 |
| 2013/0017889 A1* | 1/2013 | Kozlov | 463/42 |
| 2013/0039177 A1* | 2/2013 | Ozawa | 370/230 |
| 2013/0203501 A1* | 8/2013 | Pereira et al. | 463/42 |
| 2014/0011581 A1* | 1/2014 | Spitzer et al. | 463/29 |
| 2014/0329598 A1* | 11/2014 | Horovitz et al. | 463/31 |
| 2014/0342823 A1* | 11/2014 | Kapulkin et al. | 463/31 |
| 2014/0342834 A1* | 11/2014 | Tappeiner et al. | 463/42 |
| 2014/0364224 A1* | 12/2014 | Hess et al. | 463/31 |

* cited by examiner

SYSTEM FOR OPTIMIZING PROCESSING CAPACITY FOR A GROUP OF GAMING APPLIANCES ENGAGED IN PLAY OF AN ONLINE GAME

BACKGROUND OF THE INVENTION

1. Field of the Invention

The present invention is in the field of online gaming and pertains particularly to methods and apparatus for dynamically optimizing processing capacities on gaming appliances engaged in game play.

2. Discussion of the State of the Art

In the art of online gaming, a game server with physics simulation capabilities manages play of a hosted game by multiple players. The players connect to the game 15 server using a gaming appliance having a network browser, a graphics user interface (GUI) and one or more data input devices adapted to enable game play. Gaming devices may vary from player to player. A gaming appliance suitable for online gaming may include a game box, a personal computer, a laptop, a smart phone, an iPad™ tablet, an Android™ smart phone device, an iPhone™ or a personal digital assistant (PDA). Many proficient game players use powerful gaming boxes or computing systems that have a graphics programming unit (GPU) card that helps to speed up the processing of graphics and other processing intensive gaming effects that might be served like fire and smoke, for example.

A challenge to the gaming system is that every player does not own a state-of-art gaming box or a gaming computer (PC). Users play games with a variety of different types of gaming appliances such as laptop computers, cell phones, smart phones, etc. Therefore, processing capacities reserved or dedicated to playing a game may be different from player to player across the board. Moreover, unexpected processes can start on a non-dedicated gaming appliance that can take away from the processing power available for processing game objects and events served from the game server during game play.

Therefore, what is clearly needed is a system for optimizing processing capacity for a group of gaming appliances engaged in play of an online game. A system such as this would help create more competition among users and would provide further incentive to play online multi-dimensional games.

SUMMARY OF THE INVENTION

The problem stated above is that reducing the performance gaps between gaming appliances is desirable for a group of gaming appliances engaged in playing an online game, but many of the conventional means for optimizing the experience across the player spectrum such as server-based port monitors also create bottlenecks and use precious game server resources. The inventors therefore considered functional components of a network-based gaming system, looking for elements that exhibit interoperability and communicative capabilities that could potentially be harnessed to provide object and effect processing optimization at the level of gaming appliances, but in a manner that would not create delay or inefficiencies.

Every gaming system is driven by gaming clients connected to the system, one by-product of which is an abundance of processing dedicated to game object and effect service at the server end and game object and effect processing on the client end. Most such gaming systems employ Internet websites and game servers to conduct the business of gaming, and game servers are typically a part of such apparatus.

The present inventor realized in an inventive moment that if, during play of an online game, processing capacities on gaming appliances could be optimized for game play by serving an appropriate version of gaming objects and effects relative to a determined level of processing capacity reserved for game play, significant leveling of the game-playing field might result. The inventor therefore constructed a unique software mechanism consisting of a server and client implement that enabled processing capacities to be monitored on client gaming appliances for the purpose of serving set versions of game objects and effects that best fit those monitored capacities in terms of processing resource requirements, which might vary between competing appliances. A significant leveling of the playing field results, with no impediment to motion or process efficiency created.

Accordingly, in an embodiment of the present invention, a network-connected system serving digital games is provided, comprising a first software application executing from a non-transitory physical medium optionally coupled to a game server, the server serving a digital games to individual ones of network-connected digital appliances, and distributed client software applications executing from non-transitory physical mediums coupled to the network-connected digital appliances. The client software applications monitor local processing capability for real-time processing of served objects and effects, communicate capability information to the game server, and the game server serves objects and effects compatible with a higher level of processing capability or objects and effects compatible with a lower level of processing capability depending on the capability information communicated.

In one embodiment the network is the Internet network. Also in one embodiment digital appliances include but are not limited to a game box, a personal computer, a laptop, a smart phone, an iPad™ tablet, an Android™ smart phone device, an iPhone™ or a personal digital assistant (PDA). In one embodiment multiple different versions of the objects and effects for a game are maintained separately by the game server for the purpose of serving the objects and effects according to the communicated processing capabilities of the digital appliances. Adjustable parameters of objects and effects served may include but are not limited to pixel count, zoom capabilities, object size, effect particle resolution, rates of animation of objects and effects, and visual effects and rendering quality.

In some embodiments processing capability is measured by averaging percentage of CPU usage and or graphics accelerator card usage. Also in some embodiments the communicated processing capacity determines whether the sever will raise the level, lower the level, or continue to maintain the current level of quality and complexity relative to the game objects and effects served to the digital appliance.

In some embodiments the server operates by preprogrammed levels, each associated with objects and effects appropriate to that level, and also creates custom levels for specific appliances during game play based on a processing capability average outside the preprogrammed levels. In these embodiments individual objects and effects may have selectable parameters, and the server adjusts parameters including but not limited to pixel size, zoom capabilities, object size, particle resolution, rate of animation, and visual effects and rendering quality.

In another aspect of the invention a method adjusting digital games to capability of digital appliances is provided, comprising steps of (a) providing monitoring software monitoring capability of individual, network-connected digital appliances to operate in playing a game served by a network-connected server; (b) during play of a game served by the server, determining by the monitoring software capability for individual digital appliances to process objects and effects in playing the game; (c) sending information regarding the capability determined in step (b) to the server; and (d) selecting by the server objects and effects for individual digital appliances depending on the capability information sent by the digital appliances in step (c).

In one embodiment of the method the network is the Internet network. In another embodiment of the method digital appliances include but are not limited to a game box, a personal computer, a laptop, a smart phone, an iPad™ tablet, an Android™ smart phone device, an iPhone™ or a personal digital assistant (PDA). In some embodiments multiple different versions of the objects and effects for a game may be maintained separately by the game server for the purpose of serving the objects and effects according to the communicated processing capabilities of the digital appliances. Adjustable parameters of objects and effects served may include but are not limited to pixel count, zoom capabilities, object size, effect particle resolution, rates of animation of objects and effects, and visual effects and rendering quality.

In some cases processing capability is measured by averaging percentage of CPU usage and or graphics accelerator card usage. In some cases the communicated processing capacity determines whether the sever will raise the level, lower the level, or continue to maintain the current level of quality and complexity relative to the game objects and effects served to the digital appliance. Also in some cases the server operates by preprogrammed levels, each associated with objects and effects appropriate to that level, and also creates custom levels for specific appliances during game play based on a processing capability average outside the preprogrammed levels. Also, individual objects and effects may have selectable parameters, and the server may adjust parameters including but not limited to pixel size, zoom capabilities, object size, particle resolution, and rate of animation.

BRIEF DESCRIPTION OF THE DRAWING FIGURES

DETAILED DESCRIPTION

The present inventors provide a software-based mechanism for optimizing processing capacities of individual gaming appliances engaged in play of an online multi-dimensional game. The present invention will be described in enabling detail using the following examples, which may describe more than one relevant embodiment falling within the scope of the present invention.

Figure 1:
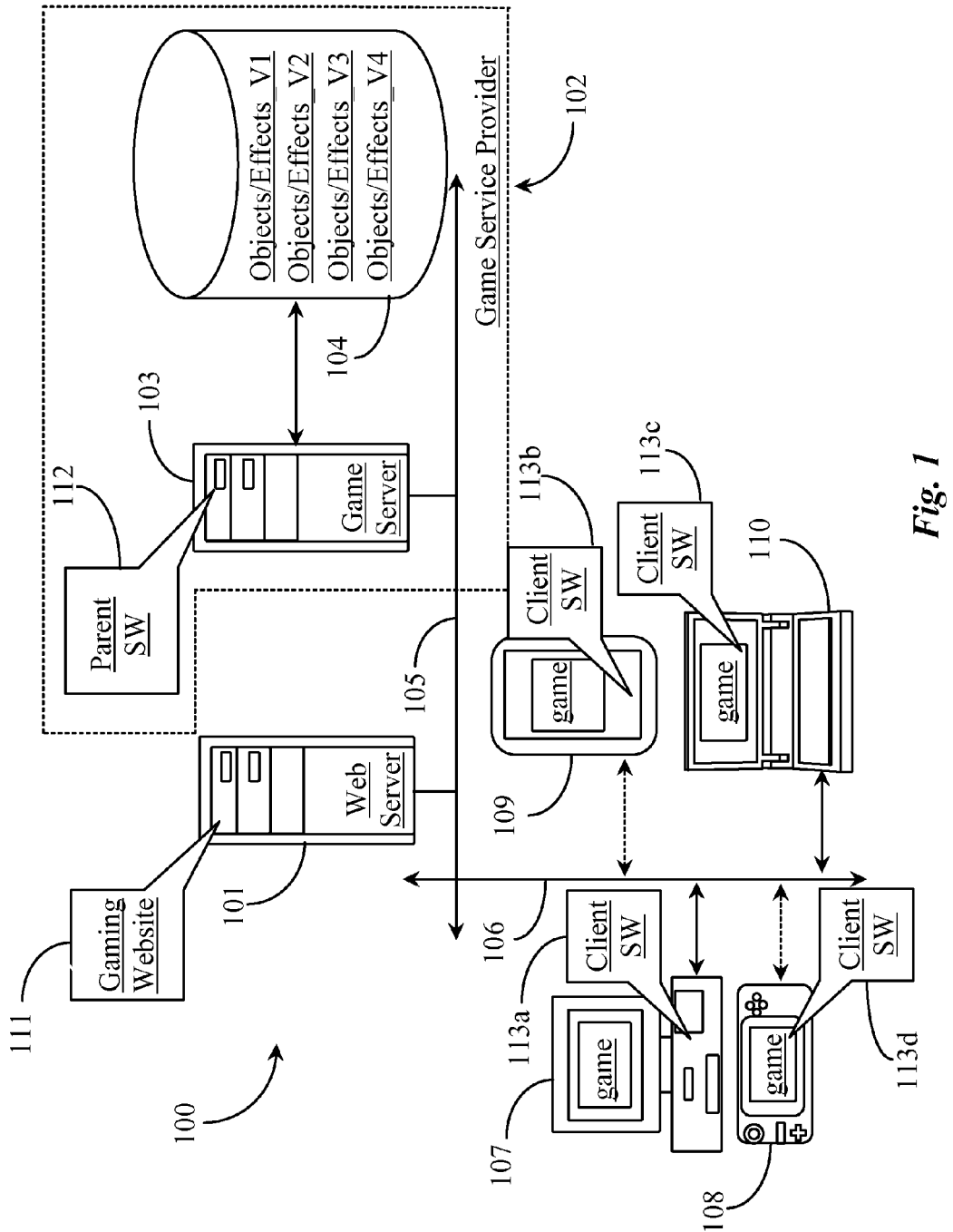
FIG. 1 is an architectural overview of a gaming network supporting process capacity optimization according to an embodiment of the present invention.

FIG. 1 is an architectural overview of a gaming network 100 supporting process capacities optimization according to an embodiment of the present invention. Gaming network 100 includes a wide-area-network (WAN) represented herein by a WAN backbone 105, and at least one sub-network or access network represented herein by an access network backbone 106. WAN 105 may be a private or corporate WAN or public WAN like the Internet network for example. In a preferred embodiment, WAN 105 is the Internet network and may be referred to in this specification as Internet network 105. In this light, backbone 105 represents all of the lines, equipment, and access points making up the Internet network as a whole, therefore practice of the present invention is not geographically limited.

Internet network 105 supports a web server 101. Web server 101 is adapted to maintain and grant access to enterprise websites such as a gaming website 111. Web server 101 includes or has access to a physical digital medium containing all of the software and information required to function as a web server. Gaming website 111 is hosted by an enterprise that provides online gaming services and associated socially interactive experiences. In this example, the enterprise hosting gaming website 111 engages a third-party game service provider 102 for the purpose of serving online games and associated functionality to subscribing clients of the enterprise who gain access to games through the website.

Game service provider 102 includes a game server 103 adapted to serve online games and associated materials to requesting clients. Game server 103 includes a physical digital medium containing all of the software and information required to enable function as a gaming server. Game server 103 is coupled to a mass repository 104 containing game objects and effects associated with games that are served by gaming server 103. In this example, there are several hierarchical quality versions of the gaming objects and effects stored in repository 104 that will be processed by clients in the course of engagement. In one embodiment, one enterprise provides both the web interface and the game service functionality under one roof. In this example, game service is leased by the enterprise.

Access network 106 represents any sub-network or carrier network having connective access to Internet network 105. Access network 106 may be any type of connected sub network including but not limited to a digital wireless network, a local area network (LAN), a telephone network such as a public-switched-telephone-network (PSTN), or a cellular network. A variety of different gaming appliances are illustrated in this example and are assumed connected to game server 103 through access-network 106 and Internet network 105. These are gaming appliance 107, which is a personal computer (PC), gaming appliance 108, which is a hand-held platform connecting to the Internet wirelessly, gaming appliance 109, which is an iPad type platform connecting to the Internet wirelessly, and gaming device 110, which is a laptop computer.

In one embodiment of the present invention, a software suite is provided for optimizing the processing capacities of gaming appliances 107 through 110, part of which is a parent application (SW) 112 residing in executable form on the physical digital medium of game server 103. Parent software 112 is adapted to listen over the network for client versions of the SW suite such as client SW applications (113a-d) to report current processing capacities and suggested strategic information resulting from active port monitoring of the game port on the appliance. Client SW 113(a-d) is separately versioned to illustrate application on different appliances. For example, client SW 113a running on OPC 107 may not be the same version as client SW 113d running on handheld 108 as they are two different machines, likely supporting different platforms.

Client SW 113(a-d) is at least responsible for monitoring the gaming port of a gaming appliance like one of appliances 107 through 110 for processing capacity while the appliance is engaged in game play at game server 103. The reason for real-time monitoring is to ascertain the ongoing rate of frames processing that the appliance is generally capable of expressed in frames per second (fps). The system establishes two or more tiers or levels of media quality relative to game objects and effects served to the gaming appliances that are all engaged in playing the same game at the server. Any given tier or level may be expressed in terms of the number of frames that the appliance should be able to process in one second.

The lowest established tier points to game objects and effects of a resolute quality that any appliance functioning at or near the associated frame rate should be able to process without losing fluidity during play of the multidimensional game. The next higher tier or level would point to game objects and effects that are of higher general quality and are typically served to a gaming appliance that demonstrates a higher capacity for processing the objects and effects. A higher or highest tier would point to the best resolute quality available in the game objects and effects. Results of monitoring are communicated in an ongoing manner or in periodic communications from the client SW to the parent SW running on game server 103.

Parent SW 112 takes the information from client SW 113 (a-d) and acts upon the information relative to game object and effects service. A gaming appliance 1 that is processing frames at or near the highest established level or tier is served the highest quality game objects and effects during play of a game. Similarly, a gaming appliance 2 playing the same game and processing frames at or near the lowest established tier or level is served the lowest quality game objects and effects. Each game object or game effect may have one or more adjustable attributes such as pixel count (image resolution), particle resolution, animation range, color attributes, shading, anti-alliasing, and others. Game objects and game effects have attributes that are adjustable in terms of the quality at which those objects and effects are renderable.

In one embodiment, each tier or level established is linked to specific versions of the game objects and effects that have adjustable quality parameters. For example, level one may be linked to quality version 1, level two may be linked to quality version two, and so on. In this example there are four versions of objects and effects for the same game in mass repository 104. In this case the client SW might determine locally what level is currently appropriate for a gaming device, the level identification sufficient to trigger the service of game objects and effects linked to that level by the overall quality of those objects and effects resulting from the pre-established quality settings of the adjustable attributes of those objects and effects.

In one embodiment, the game objects and effects stored in mass repository 104 are base models and can be dynamically rendered and served to a gaming device according to the level of quality demanded by the tier the device is currently assigned. Client SW 113(a-d) may change level assignments on a gaming device dynamically during game play. For example, if a gaming device is assigned to level two based on monitoring of surplus processing capacity for a specific game, client SW 113(a-d) can dynamically change the level assignment based on an upward or downward trend in surplus processing capacity. In an alternate embodiment, the level determination for a gaming device is made by parent SW 112 running on game server 103.

In practice, assuming that gaming appliances 107-110 are all connected online with gaming server 103 and engaged in playing the same multi-dimensional game, client SW 113(a-d) looks for surplus processing capacity locally on each appliance. Processing capacity surplus is defined as capacity left over from a processing capacity budget allotted for a particular assigned level. Assume a rule that for a level the expected frame rate of processing required to successfully process rendered and served game objects and events is 30 frames per second. In other words any gaming appliance should be able to process 30 fps at level one. In the beginning of play all connected gaming appliances may be pre-assigned a level based on the expected or predicted processing capacities of those appliances and operating platforms.

In the example described above, appliances 107-110 may get different pre-assignments such as level one for gaming appliance 107 (PC), a level two for gaming appliance 108 (hand held unit), a level three for gaming appliance 109 (iPad device), and a level one for gaming appliance 110 (laptop). Part of level or tier pre-assignment involves predicting the processing power of an appliance based on appliance type and operating system. In this regard, a dedicated gaming machine with a dedicated GPU might receive a higher tier pre-assignment then a multi-task general-purpose personal computer might receive.

Once pre-assigned levels are established, the appliances are monitored as they process frames containing the appropriate quality versions of the game objects and effects for the game they are playing. Tier assignments may be specific to certain games or they might be generalized to each appliance and platform type. Client SW 113(a-d) monitors each appliance locally at the gaming port of the appliance to ascertain rate of frame processing of frames served during objects and effects processing. Given a target frame rate of 30 fps for an assigned level, a budget may be derived for the successful processing of a single frame at that level. The budget for one single frame is 33 milliseconds. If a gaming appliance such as iPad 109 can process a frame on the order of 20 milliseconds, there would be 13 milliseconds of spare or "surplus" processing capacity. A processing capacity surplus might justify raising the current level to one higher level. On the other hand, a processing capacity deficit may justify lowering the tier level causing less quality game objects and effects to be served.

In one embodiment, client SW 113(a-d) may be enabled to dynamically order a custom tier level that sits between two well-established tier levels. This can happen, for example, if a gaming appliance cannot quite maintain fluid processing at a higher tier level but is much faster than required at the current assigned level. In order to prevent a back and forth shifting between tier levels, a custom level may be created where the appliance can successfully process the frames without lag or without under utilization of processing capacity.

Figure 2:
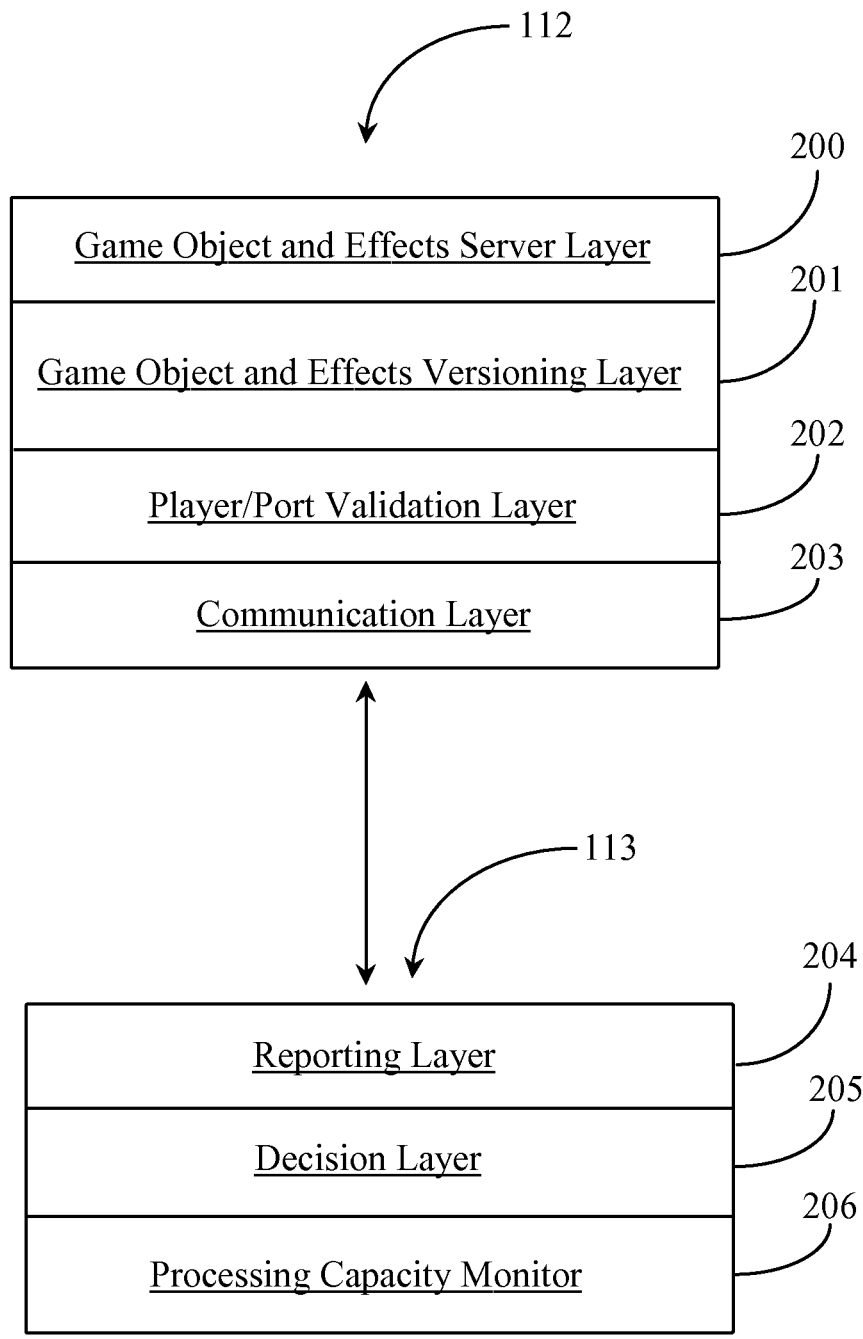
FIG. 2 is a block diagram illustrating basic component layers of the software applications of FIG. 1 according to an embodiment of the present invention.

FIG. 2 is a block diagram illustrating basic component layers of software applications 112 and 113 of FIG. 1 according to an embodiment of the present invention. Parent SW 112 may include a communication layer 203. Communication layer 203 includes all of the components required to enable communication between the parent SW and distributed instances of client SW over the network. Parent SW may utilize communication layer 203 to receive reports from distributed instances of the client SW on an ongoing or periodic basis.

Parent SW 112 may include a player validation layer 202. Player validation layer 202 includes all of the components necessary to validate a current game player appliance at the game server. Player validation may be performed at the general Website before server redirect to the game server. However, the game server may also validate players and gaming appliances to further security enhancement during a gaming session. In one embodiment, parent SW 112 includes a game objects and effects versioning layer 201. In this embodiment, the versioning layer enables creation of object and effect quality versions on the fly before they are served. Parent SW 112 may dynamically adjust object or effect attribute quality settings to create a new version or revision of a set of game objects and effects.

Parent SW 112 includes a game object and effects server layer 200. Server layer 200 contains all of the required components for serving the game objects and effects upon requests received from the gaming appliances. In one embodiment parent SW 112 is installed as part of the server SW and performs a modified server function in that the SW can select from different preset quality versions of game objects and effects. In one embodiment, SW 112 controls versioning and can dynamically adjust quality levels of game object and game effect attributes to create new versions.

Client SW 113 includes a reporting layer 204. Reporting layer 204 contains all of the necessary components required to enable reporting of results of monitoring. Reporting may take place periodically on the level of several times per second or more approaching continuous reporting of monitoring results. Client SW 113 includes a decision layer 205. Decision layer 205 includes all of the required components for ascertaining the level of processing resources dedicated to processing the game objects and effects served according to a given level of quality and the capability of determining the same level or a different level of quality should be assigned to the gaming appliance based on the processing capacity.

Client SW 113 includes a processing capacity monitor 206. Processing capacity monitor 206 looks for surplus or deficit trending in the processing capacity of the gaming appliance when processing frames based upon a target number of frames per second (fps) for the currently assigned level. Parent SW 112 and client SW 113 form a software suite. Certain functions such as determining if a gaming appliance needs a higher or lower level assigned may be performed by either the client SW 113 or by the parent SW 112 without departing from the spirit and scope of the present invention.

Figure 3:
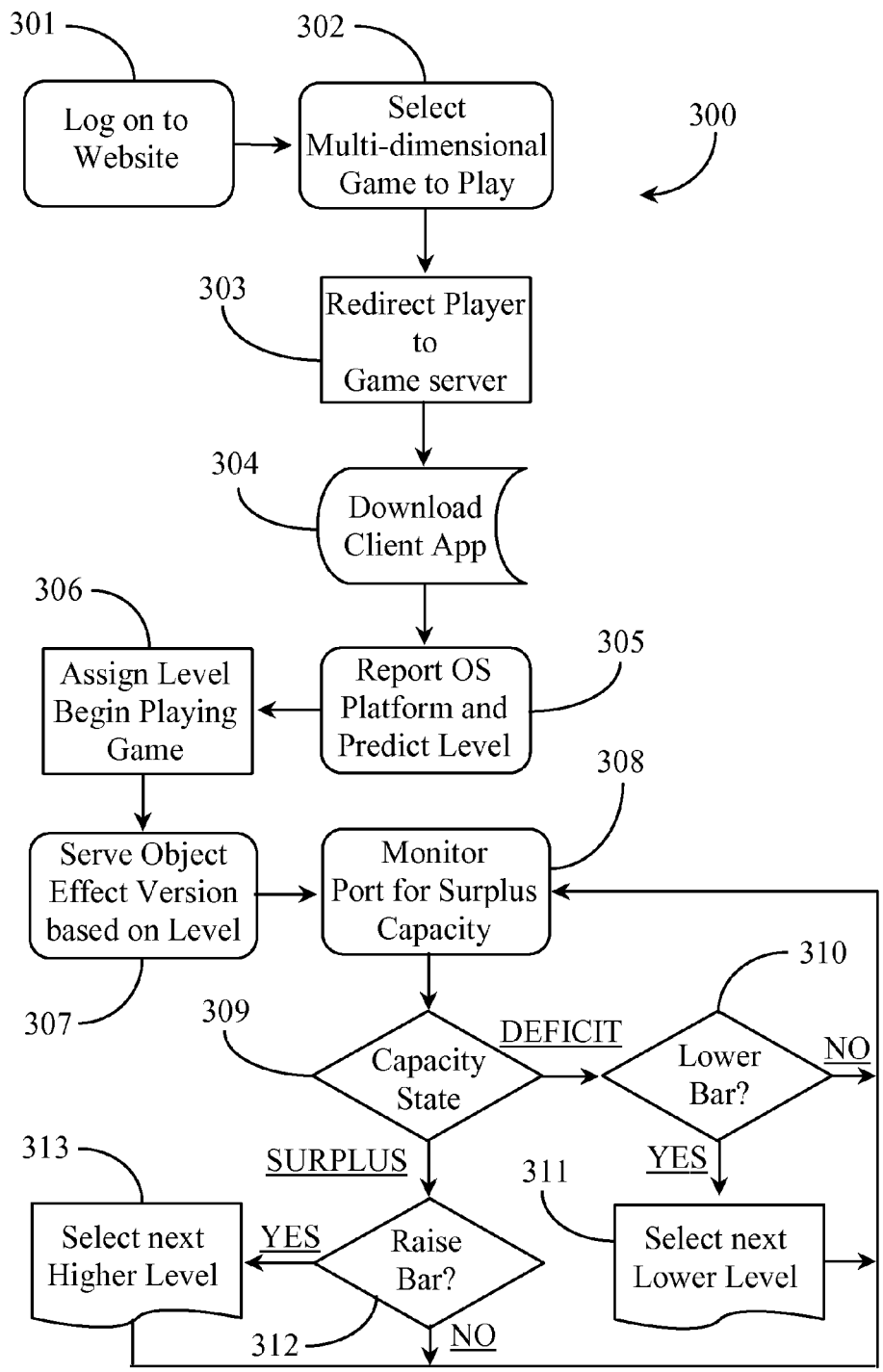
FIG. 3 is a process flow chart illustrating steps for optimizing processing capacity for a group of gaming appliances engaged in play of an online game

FIG. 3 is a process flow chart 300 illustrating steps for optimizing processing capacity for a group of gaming appliances engaged in play of an online game. At step 301 a user operating a gaming appliance such as one of appliances 107-110 of FIG. 1 logs on to a gaming website such as website 111 running on web server 101 in FIG. 1. At step 302 the user may select a multi-dimensional game to play. At step 303, the website performs a server redirect to a gaming server such as gaming server 103 of FIG. 1 running parent SW 112. At step 304, the client downloads a client SW application like client SW 113(a-d).

Machine and operating system description may be required in order that the correct client SW version may be downloaded and installed on the client gaming appliance. It is noted herein that the client download may occur before the redirect step 303 and the client SW may be available from the gaming website. In one embodiment, the client SW instance is generic to a specific game and is a temporary download offered from the gaming server to all the players before they start playing the game. In this aspect, the game version of the SW may also include different versions for different gaming appliances.

At step 305, the client SW installs on the gaming appliance, gathers required information, and reports the gaming appliance OS and platform for the purpose of assigning an initial quality level of service. This function may be performed on the local appliance by the client or from the game server controlled by the parent SW. In this example, the client SW predicts the initial level that the gaming appliance is expected to perform best at. At step 306 the predicted level is assigned to the gaming appliance and the appliance begins play of the multi-dimensional game. The gaming server aided by the parent SW serves the objects and effects at step 307 based on the level assigned at step 306.

At step 308, the client SW running at the gaming appliance monitors the gaming port for surplus processing capacity defined as the difference between an allotted processing budget for processing a single frame from the game server and the actual processing load required to process the frame in a fluid and acceptable manner. For example a level may have an expectation that a gaming appliance process 30 frames a second leaving 33 milliseconds for the processing of each frame served under the assigned level.

At step 309, the client SW determines a current state of processing capacity during real-time processing of the rendered frames by the gaming appliance. This step may be a continuous monitoring operation of a periodic "state of monitoring" check. A periodic check may be performed several times per second. In step 309, the SW seeks to determine if there is a surplus of processing capacity for processing frames under the assigned level, or if there is a deficit of processing capacity for processing frames under the level assignment. If at step 309, there is a deficit processing capacity it means that it is taking the gaming appliance longer to process individual frames associated with the current level assignment. If there is a surplus of processing capacity, it means that the gaming appliance is processing individual frames faster than required under the assigned level.

If there is a deficit in processing capacity, the client application may determine whether or not to lower the bar to a next lower level. This decision may depend upon a deficit value that may be averaged over several or more frames. If at step 310, the client SW determines not to lower the bar, then the process may resolve back to step 308 where monitoring resumes. If there is a surplus of processing capacity at step 309, the client SW may determine whether or not to raise the bar to a next higher level at step 312. This decision may depend on the surplus value that may be averaged over several or more frames. If at step 312, the client SW determines not to raise the bar, then the process resolves back to the monitoring state at step 308.

If the client SW determines at step 310 to lower the bar, at step 311 the next lower level is selected and assigned to the client gaming device. This action will result in a lower process intensive version of gaming objects and effects rendered for and served to that gaming appliance. The process then immediately resolves back to step 308 for further monitoring. If the client SW determines at step 312 to raise the bar, at step 313 the next higher level is selected and assigned to the client gaming device. This action will result in a higher process intensive version of gaming objects and effects rendered for and served to that gaming appliance. The process then immediately resolves back to step 308 for further monitoring.

It is noted herein that the surplus capacity or deficit values may be required to meet certain threshold values before a new level is assigned to the gaming appliance. As the process ensues, processing capacity may wax and wane depending on a number of factors. A dedicated gaming device may be assigned a higher level initially than a multitask gaming appliance. This may be due to a fact that other non-game-related processes may start and run on the multitask appliance while it is engaged in game play forcing a downward trending in processing capacity resulting in a deficit. The SW takes into account the temporary nature of these fluctuations and may average them over time to ascertain an average capacity. A dedicated gaming appliance may not experience the kind of limitations as a multitasking appliance. However, some processes like virus protection, updating, and so on may affect the processing capacity of a dedicated appliance as well.

Although not illustrated in this example, a function for creating a custom quality level may be available for enabling the parent SW to generate a customer quality level or tier for an individual gaming appliance if it is necessary to optimize the available processing capacity on that appliance. A custom level is not required in order to practice the present invention, but may be convenient to prevent back and forth shifting of a gaming appliance between different levels. During game play, any gaming appliance playing the game may have a transition from one level of quality to a next level of quality. In one embodiment, if the processing capacity or deficit values suggest, the transition may skip a level in the hierarchal order, for example from level one to level three (bypassing level two).

Over time, the level of service to a gaming appliance becomes customized to the point that it processes most if not all of the game objects and effects in an efficient manner with no processing capacity deficit while utilizing as much surplus processing capacity as practical. With multiple gaming appliances engaged in play of a single game, the invention works to level the playing field somewhat, seeking to reduce the performance gaps between the appliances relative to efficient and rewarding game play regardless of appliance computing platform or OS.

Figure 4:
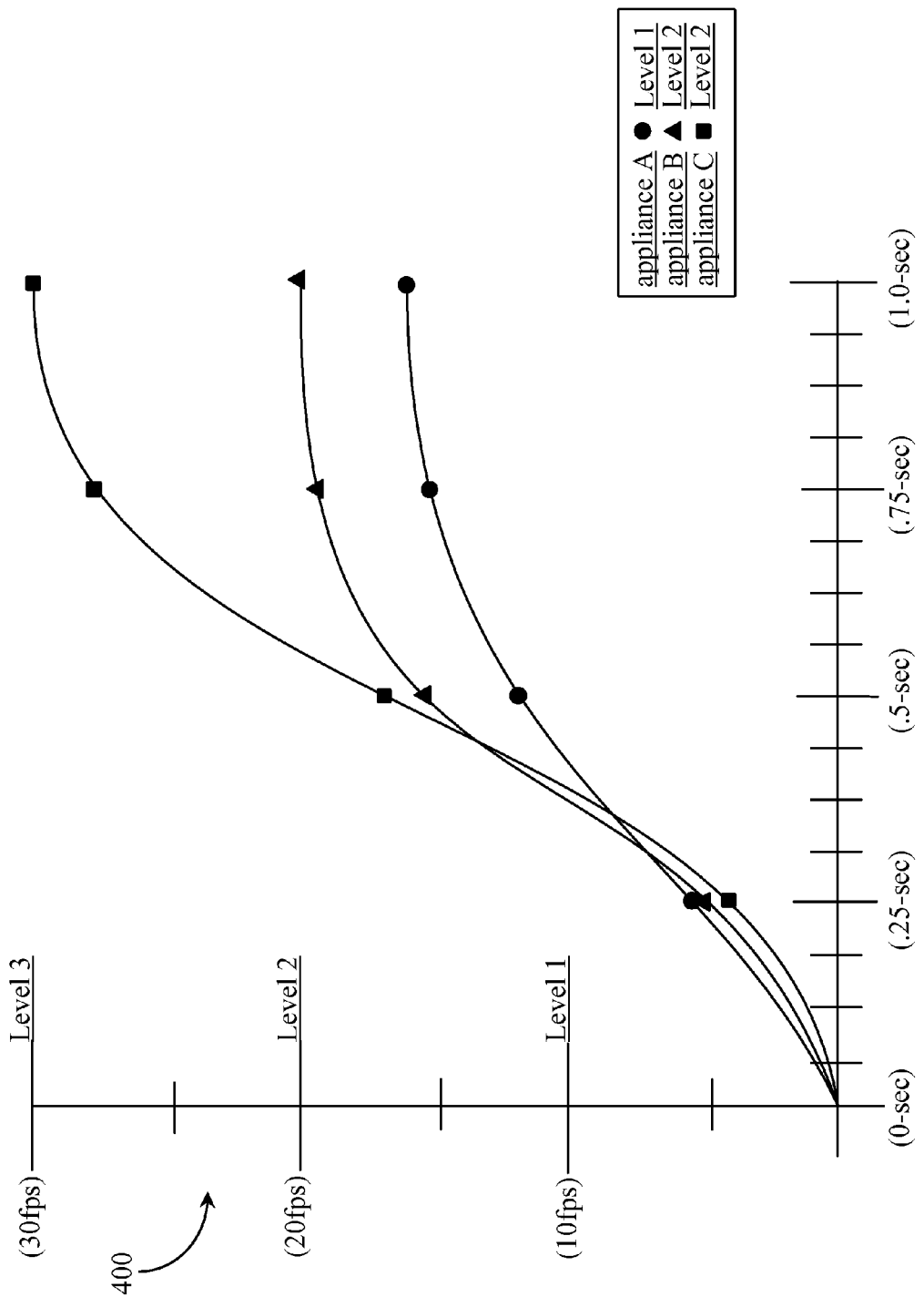
FIG. 4 is a line graph illustrating frame-processing capacity for three gaming appliances engaged in game play.

FIG. 4 is a line graph 400 illustrating frame-processing capacity for three gaming appliances engaged in game play. Graph 400 plots processing performance of three gaming appliances playing an online game. The line graph plots the numbers of media frames rendered and served from the gaming server that are processed by the gaming appliances over time.

On the vertical axis three media quality levels are identified as a level 1, a level 2, and a level 3. The target frame rates are given with level 1 associated with a frame rate of 10 fps, level 2 with a frame rate of 20 fps, and level 3 with a frame rate of 30 fps. Therefore, to achieve level 1, a gaming appliance needs to process at least 10 frames per second with an allocation of 100 milliseconds per frame. To achieve level 2, a gaming appliance needs to process at least 20 frames per second with an allocation of 50 milliseconds per frame. To achieve level 3, the gaming appliance needs to process 30 frames per second with an allocation of 33 milliseconds per frame. It is noted herein that the levels illustrated herein are logical only and may not reflect actual processing speeds of actual gaming appliances. Processing capacities will vary from appliance to appliance. A reasonable target for a quality level or tier is about 30 frames per second. However, any rate above 12 frames per second is sufficient to achieve fluid video.

In this example, the client SW checks the processing performance of the appliances every quarter second. This frequency is arbitrary. In some embodiments more frequent checks may be made up to continuous reporting. Assume that appliance A indicated by a circle in a legend to the right of line graph 400 was initially assigned to level 1 and is expected to process at least 10 fps. Also assume that appliance B indicated by a triangle was originally assigned to level 2 and is expected to process at least 20 fps, and that appliance C indicated by a rectangle was also assigned level 2 and is expected to process 20 fps. Processing performance is checked for all of the appliances every 0.25 seconds beginning at the first increment (0.25 sec) from 0, which represents the beginning of game play.

At 0.25 seconds, appliance A is performing better than appliance B or appliance C although at this initial stage, they are fairly equal. However, processing performance is just begun and has not leveled for any of the appliances so nothing is reported from the first check in processing performance. The client SW checks the appliances again at 0.5 seconds. At 0.5 seconds, appliance A already shows a processing capacity surplus relative to level 1 of 24 fps or processing one frame every 42 milliseconds. It is clear at this point in the monitoring of appliance A that it has surpassed the performance criterion for the originally assigned level and could be reassigned to a higher level or level 2. The budget for appliance A is 100 milliseconds per frame. Appliance A is processing frames at 42 milliseconds per frame and still rising.

Appliances B and C are processing above the targeted allotments at the 0.5 sec. check. Appliance B has processed 16 frames at the half-second mark using on average 31 milliseconds to process a single frame. Appliance C is utilizing approximately 28 milliseconds to process a single frame. If reported at 0.5 seconds, appliance B would have a surplus capacity of 19 milliseconds and appliance C has a surplus capacity of 22 milliseconds based on a target of 50 milliseconds to process a frame at level 2. Still, no appliance is leveling out so reporting may not be prudent until all of the devices are showing level processing performances.

Client SW checks again at 0.75 sec. At 0.75 sec., appliance A is processing a single frame at about 50 milliseconds out of a budget of 100 milliseconds according to level 1 criterion. Appliance B is processing a single frame at about 39 milliseconds out of a budget of 50 milliseconds according to level 2 criterion. Appliance A is processing a single frame at about 27 milliseconds out of a budget of 50 milliseconds according to level 2 criterion. At 0.75 seconds, the processing rates are still rising and have yet to level out. At one second, processing rates are considered level and a report can be issued from the local client at each appliance to the parent running on the gaming server.

At one full second, appliance A is leveling at about 16 fps using on average 62 milliseconds of time to process a single frame. Level 1 allots 100 milliseconds per frame. Appliance A reports a capacity surplus of 38 millisecond per frame. Appliance A is processing 6 more frames per second than is expected by level one criterion. However, the client SW running on appliance A may decline to recommend a transition from the quality of level 1 game objects and effects to the quality of level 2 game objects and effects. Appliance A although consistently outperforming level 1 criterion, may not be able to maintain level 2 criterion, as level 2 criterion is more process intensive and the leveling plane on the graph is just over half way between the two levels.

Appliance B has leveled out and is processing a single frame at 50 milliseconds in accordance with the allowed budget of level 2 (20 fps). Appliance C has leveled out at 33 milliseconds per frame. According to level 2, the budget for processing a single frame is 50 milliseconds per frame. Appliance C has a surplus capacity of 17 milliseconds per frame and could easily process 6.8 extra frames per second.

For appliance A, the client SW retains the same level 1 assignment because the surplus capacity would not be enough to maintain processing as expected at level 2. For appliance B, the client SW confirms there is no significant capacity surplus or deficit and therefore level 2 remains the correct or best level. For appliance C, the client SW orders a transition from level 2 to a level 3 assignment. Depending on stability of the processing curves, client SW may from time to time recommend a change in level of media quality of gaming objects and effects to be served to a gaming appliance. There may be upward and downward trends in processing capacity on any gaming appliance monitored.

The only appliance with significant capacity surplus after the transition would be appliance A processing at about 16 fps when only 10 fps is expected. Appliance A is underutilized but not enough to warrant an upgrade in media quality of the objects and effects served to the appliance. Appliance B remains at level 2 and appliance C transitions to level 3 after the first second of play. The overall effect of this management of quality of game objects and effects for service to different platforms is to level the gaming field with respect to competitive processing by disparate gaming appliances in multi-player engagement of the game.

In one embodiment where an appliance may be out performing one level but may not be able to maintain fluid processing at a higher level, a custom level might be created where the quality attribute of the game objects and effects are reduced dynamically in a custom manner relative to process intensity. In this embodiment the client SW might determine by mathematical calculation or by predictive algorithm what quality levels would be required in the attributes of the game objects and effects to form a new custom level that would be very close to or match the current processing capacity of the gaming appliance. In this aspect the new level might be retained in the system for re-service to the same client and to similar clients. In another embodiment, the system could create a processing surplus requirement if client software is getting caught up switching between two levels constantly (hysteresis problem). That way, eventually necessary surplus will be high enough so processing capacity will settle on lower level unable to jump to higher level again.

As the system matures and more gaming appliances are managed in this way, the competitive playing field becomes more level in terms of what each machine can process efficiently making all of the machines more competitive with one another.

Figure 5:
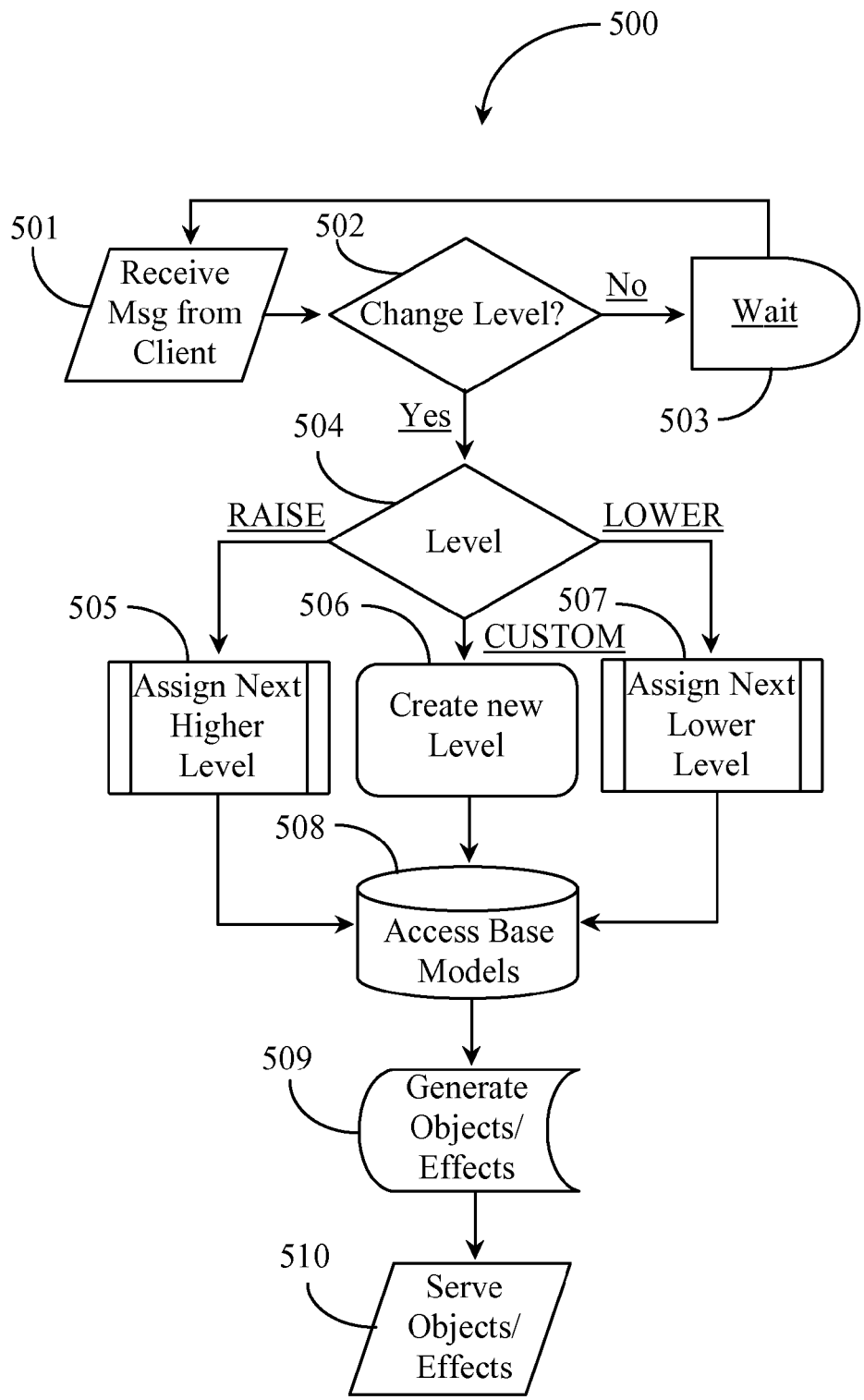
FIG. 5 is process flow chart illustrating steps for dynamic generation of object and effect versions according to assigned capacity level according to an embodiment of the present invention.

FIG. 5 is a process flow chart 500 illustrating steps for dynamic generation of object and effect versions according to assigned capacity level according to an embodiment of the present invention. It is assumed in this embodiment that the client is engaged in game play at the server and has been pre-assigned a level. At step 501 the gaming server parent SW receives a message from a client SW instance running on a gaming appliance. The message contains an order or recommendation and perhaps some raw data about current processing capacity.

At step 502, the determination is made whether or not to make a level change. This step may be performed on the client and then communicated to the server. In another embodiment, this step might be performed at the server after receiving the ram performance data from the client SW. At step 502, if it is determined that the level will not be changed, the system may wait at step 503 until a next message from the client is received. If the determination is made to change the level assignment for the gaming appliance at step 502, a second determination may be made at step 504 as to whether the level or bar will be raised or lowered.

At step 504, if the data or order indicates that the level should be lowered, at step 507 the parent SW assigns the next lower level. If it is determined that the level should be raised, the parent SW assigns the next higher level to the gaming appliance at step 505. In one embodiment a third option of generating a custom level is provided at step 506. Custom level generation would be an option when the appliance was in-between levels and had a trend of shifting back and forth between levels. To prevent this the system creates a level of quality that is close to or matches the current processing level of the appliance.

After level transition at steps 505, 506, or 507, a next service request occurs at step 508 requiring access of the base models of game objects and effects. The base models have assignable or adjustable quality parameters such as pixel count, animation range, particle resolution, alliasing effect in rendering, color saturation, shading, distance rendering, and others.

At step 509 the server, with the aid of the parent application generates the game objects and effects at the appropriate quality levels for the currently assigned level of the gaming appliance. The process occurs when transitioning to a higher level, a lower level, or to a custom level. These game objects and effects are generated on the fly from base models having neutral quality attributes. Once the game objects and effects are generated, they are rendered and served as required to the gaming appliance at step 510. In another embodiment as described further above, separate quality versions of all of the game objects and effects are maintained for service.

In one aspect of the invention, the functionality at the server for generating different versions of objects and effects is distributed to the client appliances and the proper versions are generated locally or pulled from the server. Client software may be enabled to make local rendering quality adjustments to achieve the same effect as tiered generation or service of objects and effects by the server.

In one embodiment of the present invention client SW 113(a-d) of FIG. 1 is downloaded to the gaming appliance and becomes a permanent program that runs whenever the user enters a game. In another embodiment each game has an individual client instance associated with it and it is a temporary installation that happens in the background while the user is preparing to play. A gaming appliance with a less than dedicated processor can compete with a gaming appliance running a more dedicated processor by processing frames that are less process intensive than the frames processed by the more dedicated processor. In this way the gaps between the capabilities of gaming appliances playing a same game in real time may be minimized thus, optimizing the utilization of the processing resources locally at each appliance.

In one embodiment of the present invention software 112 of FIG. 1 is not specifically required to execute from a game server. In this embodiment, the functionality of software 112 is packaged into the distributed client applications. In this embodiment, local devices monitor their own capacities and pull the appropriate game object and effect versions from the game server based on local processing capacity analytics.

It will be apparent to one with skill in the art that the process capacity management system of the present invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A gaming system comprising:
a game server connected to a network and having a first processor executing first software from a non-transitory medium;
a data repository coupled to the game server, the data repository storing a digital game based on a virtual environment, the digital game comprising objects and effects to be rendered in display during play of the game, the objects and effects stored as base models having neutral quality attributes;
a computerized appliance having a second processor executing second software, the computerized appliance connected to the network and operable to play the game served by the game server;
wherein the game server serves the game to the computerized appliance, the second software periodically monitors processing capability of the computerized appliance in frame rate during live play of the game and reports determined frame rates to the game server periodically also during live play of the game, and the game server, executing a versioning layer as a part of the first software, in response to changing frame rate capacity reported at periodic intervals during game play, creates versions of the base models of the objects and effects most compatible with a current frame rate of the computerized appliance as play progresses, and serves the created versions of objects and effects as reported frame rate of the computerized appliance changes during live play of the game.

2. The gaming system of claim 1, wherein the network is the Internet network.

3. The gaming system of claim 1, wherein the computerized appliance is any one of a game box, a personal computer, a laptop, a smart phone, or a computerized tablet device.

4. The gaming system of claim 1, wherein parameters of objects and effects served may be dynamically adjusted, including at least pixel count, zoom capability, object size, effect particle resolution, rates of animation, visual effects and rendering quality.

5. The gaming system of claim 1, wherein the second software determines if there is excess processing capacity or if processing capacity is limiting game play.

6. The gaming system of claim 1, wherein the game server operates by preprogrammed frame-rate levels, each frame-rate level associated with objects and effects appropriate to that level.

7. A method adjusting service of objects and effects for digital games to processing capability of a computerized appliance, comprising steps of:
(a) storing a digital game based on a virtual environment in a data repository coupled to a game server having a first processor executing first software from a non-transitory medium, the game server connected to a network, the digital game comprising objects and effects to be rendered in display during play of the game, the objects and effects stored as base models having neutral quality attributes;
(b) serving the game to a computerized appliance connected to the network and executing second software;
(c) monitoring processing capability at the computerized appliance in frame rate by the second software executing on a second processor at the computerized appliance;
(d) periodically reporting the monitored frame rate by the computerized appliance to the game server;
(e) as a result of each reported frame rate during play of the game, creating by the game server, executing a versioning layer as a part of the first software, versions of the base models of the objects and effects most compatible with a current frame rate of the computerized appliance as play progresses, and serving the created versions of the base models as play progresses.

8. The method of claim 7, wherein the network is the Internet network.

9. The method of claim 7, wherein the computerized appliance is any one of a game box, a personal computer, a laptop, a smart phone, or an computerized tablet device.

10. The method of claim 7, wherein parameters of objects and effects served are dynamically adjustable, including at least pixel count, zoom capability, object size, effect particle resolution, rates of animation, visual effects and rendering quality.

11. The method of claim 7, wherein the second software determines if there is excess processing capacity or if the processing capacity is limiting game play.

12. The method of claim 7, wherein the game server operates by preprogrammed frame rate levels, each frame-rate level associated with objects and effects appropriate to that level.

* * * * *